United States Patent [19]
Akeel

[11] Patent Number: 5,293,911
[45] Date of Patent: Mar. 15, 1994

[54] METHOD AND SYSTEM FOR FLUID TRANSFER AND NON-CONTACT SENSOR FOR USE THEREIN

[75] Inventor: Hadi A. Akeel, Rochester Hills, Mich.

[73] Assignee: Fanuc Robotics North America, Inc., Auburn Hills, Mich.

[21] Appl. No.: 32,621

[22] Filed: Mar. 17, 1993

Related U.S. Application Data

[62] Division of Ser. No. 771,436, Oct. 4, 1991, Pat. No. 5,238,029.

[51] Int. Cl.$^5$ ............................................. B05B 9/047
[52] U.S. Cl. ...................... 141/346; 141/26; 141/21; 141/91; 141/192; 141/351; 141/354; 141/361; 137/614.11; 901/43; 118/302; 118/323; 118/697
[58] Field of Search ................. 141/2, 18, 21, 25–27, 141/89–91, 94–96, 192, 198, 312, 318, 346, 351, 353–355, 357, 360–362, 383, 386; 239/68, 74, 112, 569, 690, 691; 222/41, 48, 389; 137/614.11, 614.04; 118/300, 302, 323, 693, 697; 901/29, 43

[56] References Cited

U.S. PATENT DOCUMENTS

| | | | |
|---|---|---|---|
| 4,785,760 | 11/1988 | Tholome | 118/323 |
| 4,798,341 | 1/1989 | Gimple | 901/43 X |
| 4,864,966 | 9/1989 | Anderson et al. | 118/302 X |
| 4,951,849 | 8/1990 | Townsend et al. | 901/43 X |
| 5,027,855 | 7/1991 | Jaggi | 137/614.04 |

Primary Examiner—J. Casimer Jacyna
Attorney, Agent, or Firm—Brooks & Kushman

[57] ABSTRACT

A method and system for transfer of fluids, such as paint, using a fluid canister carried by a transfer device, such as a robot, instead of having paint lines connected to a delivery device, such as a spray gun, carried by the robot. A novel mechanism for initially docking and then filling the canister from a fluid outlet of a pressurized source of fluid without straining the robot is provided. Also, a novel mechanism for cleaning the canister between canister fillings is provided so that paint colors can be changed without loss of productive robot time. In one embodiment, the canister is integrated with the robot. Also, a novel, non-contact sensor is provided for providing a signal to allow the metering of the paint entering or/and discharged from the canister.

20 Claims, 5 Drawing Sheets

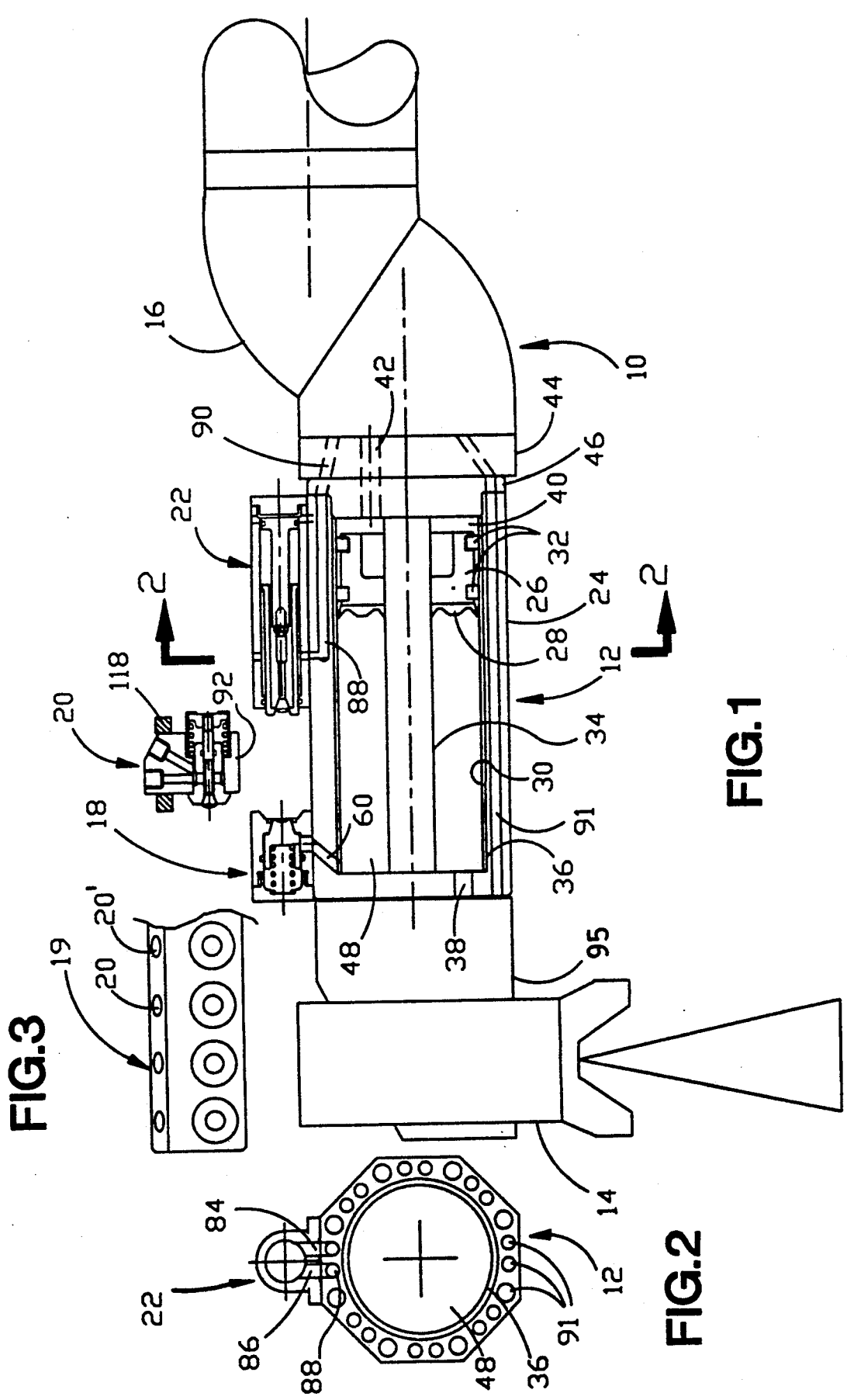

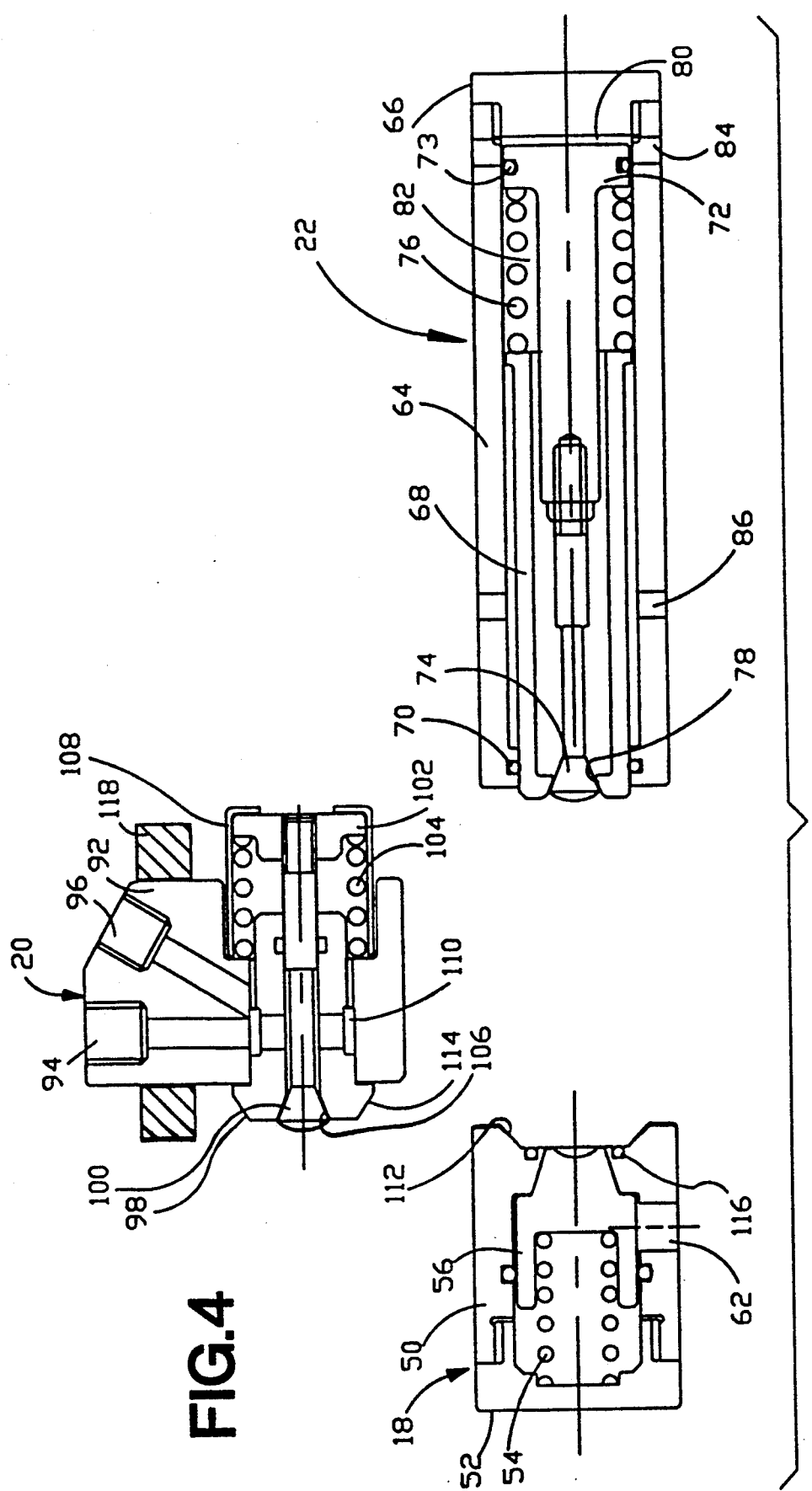

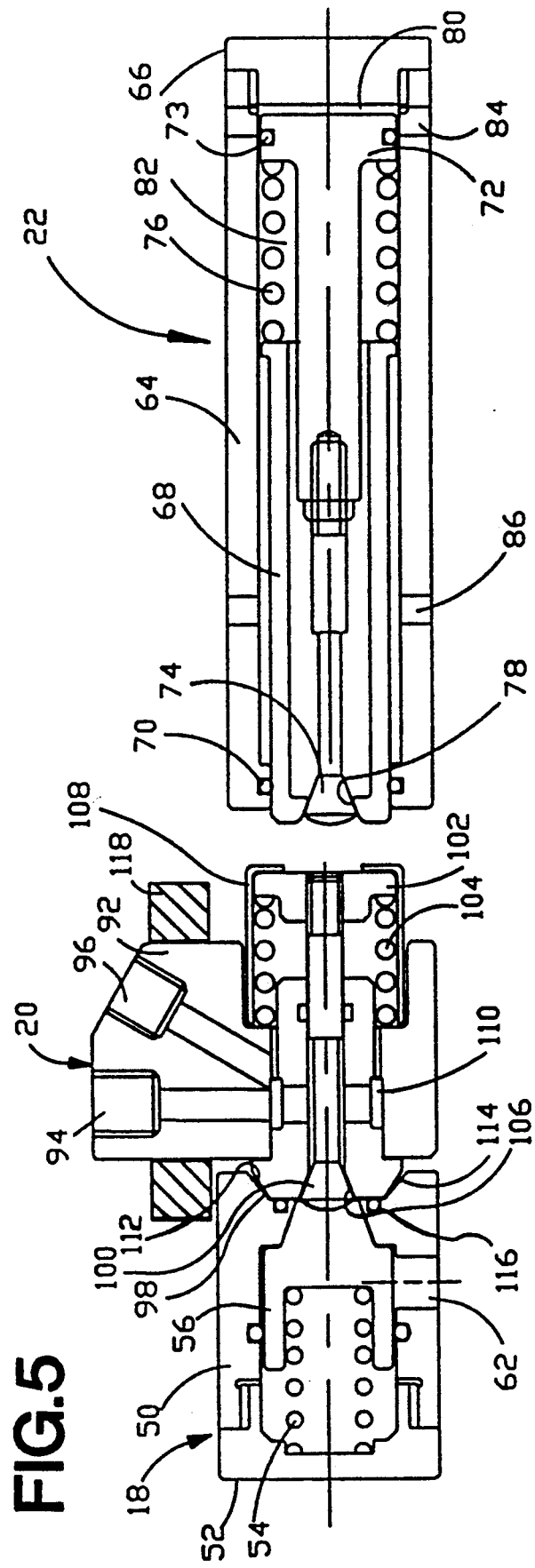

METHOD AND SYSTEM FOR FLUID TRANSFER AND NON-CONTACT SENSOR FOR USE THEREIN

This is a divisional of copending application Ser. No. 07/771,436 filed on Oct. 4, 1991 now U.S. Pat. No. 5,238,029.

TECHNICAL FIELD

This invention relates to method and system for the fluid transfer of fluid, such as paint, by a fluid transfer device, such as a robot, and a non-contact sensor for use with the method and system.

BACKGROUND ART

In production paint operations, painters change the color of the sprayed paint by disconnecting their spray guns from one paint supply line, paint drop, and connecting it to another paint drop of a different color. The old paint color is purged by discharging a small amount of the new color through the spray gun.

In contrast to manual painting, automated painting machines require the addition of automatic color changers. These devices use valves, manifolds, and occasionally long tubes to connect different color paints to the spray gun, purge the lines, valves, manifolds, and the spray gun with solvent, and refill with a new color paint. The long tubes cause considerable waste of valuable paint material and the use of much solvent to purge and clean the lines during color changes. Environmental concerns have been raised about the disposal of such materials and a more economical way for changing paint color has been eagerly sought.

One option for addressing environmental concerns has been the charging of the painting material with a high voltage electrostatic charge, exceeding 100 KV, which helps improve its coating efficiency and the economics of painting. Solvent based paints have been successfully sprayed with electrostatic charge by virtue of their natural insulating properties.

Another desirable option for addressing the environmental concerns has been the use of water based paints which pose much less threat to the environment than solvent based paints. Unfortunately, such paints are conductive of electricity and can be sprayed electrostatically only from insulated canisters, disconnected from the paint supply lines. The filling, purging, cleaning, and refilling of such canisters with different paint colors has been a challenge looking eagerly for economic solutions, particularly for high volume production operations requiring frequent color changes.

U.S. Pat. No. 4,313,475 to Wiggens addresses these challenges by means of a system of supply lines, color changers, valving arrangements, and air entrapping containers to fill the containers from the supply line, when the electrostatic charge is turned off. Valves are actuated to cause a discontinuity in the supply line, termed voltage block, that isolates it from the charged paint in the canister. Air entrapped in the container and pressurized by the filling of the canister causes the paint to flow from the canister to the spray equipment while the paint is electrostatically charged.

U.S. Pat. No. 4,771,729 to Planert et al; U.S. Pat. No. 4,932,589 to Diana; U.S. Pat. No. 4,879,137 to Behr et al; and U.S. Pat. No. 4,921,169 to Tilly all disclose various methods and apparatus for electrostatically coating a conductive material utilizing an electrical isolation mechanism, including a reservoir into which a metered volume of paint to be sprayed is introduced.

With the advent of robots, production spray painting became more efficient and attained higher quality. Color changing for robots followed the lead of automatic spray machines by using automatic color changers. However, the mobility of the robot also caused the spray lines to become longer and require more solvents to purge and clean. Electrostatics also cause damage to the long flexible supply lines as they get in contact with grounded surfaces, and eventually fail. To continue the use of electrostatics, especially with water based paints, a better method is sought for paint delivery, color changing, and electrostatic isolation, for robotic paint spray equipment.

The current approach is to connect a spray applicator by means of fluid lines to an outlet port of a paint color changer. The color changers is piped to a series of paint outlets (color drops). The color changer controls the flow of paint, air and cleaning solvents to the applicator by means of a valving arrangement. Valves are selectively opened or closed to pass the appropriate paint color to the applicator, to purge the fluid lines with air or solvents, and to clean the lines between.

Most methods of delivering paint by robots to a workpiece keep the robot connected to the supply lines by means of hoses. The length of the hoses causes paint to be wasted during color change, waste of robot time when idled for purging and color change, and restricts robot mobility.

For electrostatic painting with conductive paints, such as water based paints, the charging of the paint causes the high voltage charge to be communicated to the rest of the paint supply system through the paint lines, hence impeding the use of such paints despite their environmental advantages.

Most current methods for painting with robots require the use of automatic color changers with a multiplicity of valves and control solenoids to connect the appropriate color to the spray gun of the robot and to provide sequenced operations for color changing and line cleaning. This is not always a necessity and adds expense and complexity to the painting process.

In contrast with the above, manual painting requires no color changers as the person has the ability to connect his spray gun to the source of the desired color directly and disconnect it when he is finished using that particular color. Cleaning is also limited to the spray nozzle since the paint delivery lines need not be cleaned as they do not pass different color paint, hence manual painting uses little cleaning solvents. Furthermore, less time is spent to switch from one color to another, without paint line cleaning, allowing more time for productive painting. However, manual painting is known to be deficient in quality.

U.S. Pat. No. 4,785,760 to Tholome discloses a sprayer installation including a robot, a sprayer carried by the robot and a storage tank for a fluid, such as paint to be sprayed, also carried by the robot.

The mobility of the robot simplifies its operation and eliminates the need for automatic color change equipment. Mobility of the robot is also used to eliminate the need for special insulating provisions to isolate the spray equipment from the paint supply lines. The robot mimics manual painting operations rather than automatic machine operations, hence, requiring no automatic color changers, and no special voltage blocks for periods of electrostatic spraying.

U.S. Pat. No. 3,674,207 to Carbonetti, Jr. et al; U.S. Pat. No. 4,944,459 to Watanabe et al; and U.S. Pat. No. 5,029,755 to Schmidt et al all disclose the use of a robot or manipulator which is utilized with other apparatus to change paint color.

SUMMARY OF THE INVENTION

An object of the present invention is to provide a practical method and system for color changing in production painting operations using a transfer device, hence eliminating the need for supplemental automatic color changers without straining the transfer device.

Another object of the invention is to provide a system and method for docking a container carried by a transfer device with a pressurized source of fluid for filling the container with the fluid without straining the transfer device.

Still another object is to provide a method and system for cleaning a painting container carried by a transfer device between container fillings without loss of productive time.

Still further, an object of the invention is to provide a method and system for cleaning a robotic canister that uses less solvents and is more friendly to the environment.

Another object of the invention is to provide a non-contact sensor for metering the flow of fluid in a container.

Still another object is to provide an improved method and system for robotic painting wherein the robot carries its desired quantity of paint in a reservoir to the painted object and cleans the reservoir before filling it with a new color paint. This eliminates the long and cumbersome paint lines connecting the robot to the paint source lines, thus reducing paint waste and the need for using environmentally hazardous solvents.

An object of the invention is to provide a method and system for eliminating the need for isolating electrostatically charged robotic paint process equipment from paint supply lines, hence enabling the use of environmentally desirable conductive, water-based, paint materials.

Finally, a still further object of the invention is to provide a robotized paint spraying method and system complete with a robot, paint spraying means, paint reservoir, docking means for the reservoir with a paint drop, means for cleaning the paint passages between canister fillings as necessary for color changing, means to maintain the filling interfaces clean during actual painting operations, and control means for programmed control of the robot, and the canister docking, filling and cleaning sequences.

In carrying out the above objects and other objects of the present invention, a method for transferring fluid from a pressurized source of fluid is provided. The method includes the steps of providing the pressurized source of fluid with an outlet valve and providing a transfer device with a fluid reservoir having an inlet valve and a delivery device for the fluid. The method also includes the steps of moving the transfer device with the reservoir to a docking position so that the inlet valve of the reservoir is located immediately adjacent the outlet valve of the pressurized source of fluid, sealingly mating the inlet valve with the outlet valve and opening the inlet and outlet valves to fluidly communicate a filling port of the reservoir and a fluid outlet of the pressurized source of fluid. Finally, the method includes the steps of filling the reservoir with a predetermined amount of fluid from the pressurized source of fluid, closing the inlet and outlet valves, moving the transfer device with the filled reservoir to a fluid delivery position and fluidly communicating the fluid from the reservoir to the delivery device.

Preferably, the inlet and outlet valves are opened substantially simultaneously and the inlet and outlet valves are closed substantially simultaneously.

Also, preferably, the method further includes the step of providing actuating means movable between a home position, a sealing position, and an actuating position wherein the step of opening includes the step of moving the actuating means from its home position to the sealing position to apply a sealing force for mating the inlet and outlet valves and then to its actuating position to open the inlet and outlet valves.

Preferably, the inlet valve is sealingly mated with the outlet valve during the steps of opening, filling and closing.

Also, preferably, the method further includes the step of sealingly protecting the filling port from contamination at least during the step of moving the transfer device to the fluid delivery position.

A system is also provided for carrying out each of the above steps.

Further in carrying out the above objects and other objects of the above invention, a non-contact sensor for sensing the linear position of a body which moves linearly in an environment is provided. The sensor includes an assembly having means for defining a cavity insulated from the environment and generating means for generating a magnetic field within the cavity. The generating means is adapted to be coupled to the body to move linearly therewith. The assembly includes a sensor element disposed within the cavity and a ferromagnetic device supported for linear movement within the cavity to move in response to movement of the generating means and its magnetic field along the sensor element. The sensor element has a property which is a function of the position of the device along the sensor element within the cavity. The sensor is adapted to provide a signal representative of the property of the sensor element whereby the position of the device along the sensor element in the cavity is indicated.

Preferably, the generating means includes a magnet.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic side elevational view, partially broken away and in cross-section, illustrating the method and system of the present invention;

FIG. 2 is a cross-sectional view of a canister and actuating cylinder illustrating passages feeding into a manifold for spray gun control;

FIG. 3 is a side elevational view partially broken away of a paint drop cluster wherein different color drops share a single casing;

FIGS. 4–7 are enlarged side elevational views, partially broken away and in cross-section illustrating the details of the mechanism for filing the canister and the procedure for doing so;

BEST MODE FOR CARRYING OUT THE INVENTION

Figure 9:
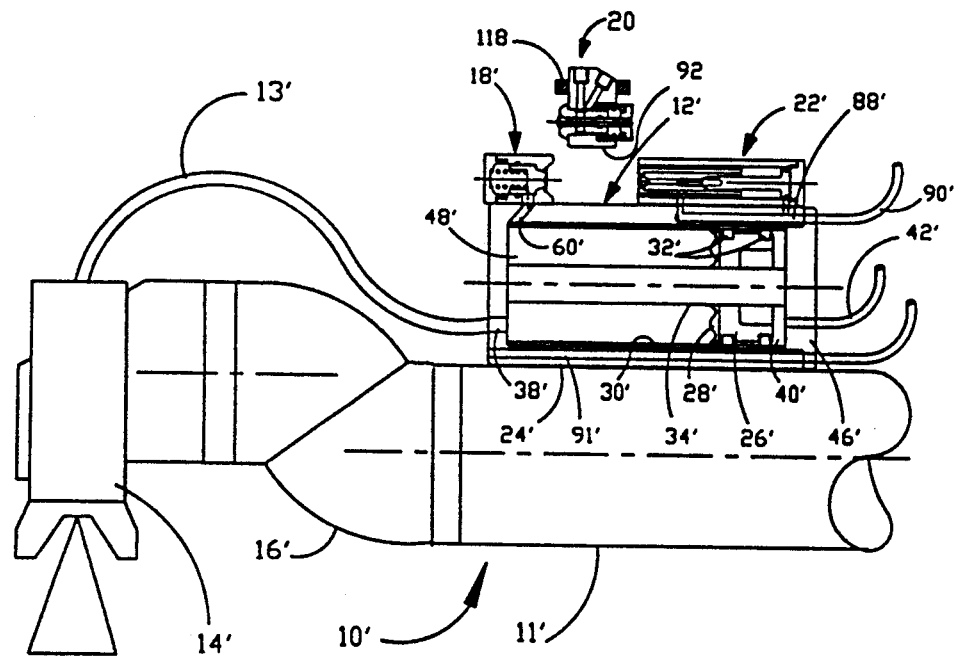
FIG. 9 is a view similar to FIG. 1 but illustrating another embodiment of the invention.

Referring to FIG. 1, in the method and system of the present invention, a transfer device such as a robot, generally indicated at 10, carries a reservoir or canister, generally indicated at 12, and uses the fluid contained therein to spray an object by way of a spraying device, such as a spray gun 14. The canister 12 is filled with the fluid such as a paint of a desired color and is fixedly attached to a robot part such as a robot wrist 16 or a robot arm part 11' as illustrated in FIG. 9.

When the canister 12 is emptied, the robot 10 "docks" at a paint supply station, connects the canister 12 to the source of paint by means of a check-valved connection, in a manner similar to that used with manual painting, and allows the canister 12 to be refilled by the desired paint. When the color is to be changed, the robot 10 initiates a sequence to clean the canister 12 before refilling, and prepares it to accept a different color paint without risk of contamination by residues remaining from a previously used paint color.

In one embodiment, the cleaning sequence is initiated internal to the robot 10, and the robot 10 connects to individual paint drops, each having a different color paint, hence eliminating the need for automatic color changers. This method requires that the robot 10 either carries its own solvent and air cleaning lines, or is programmed to go to docking locations of solvent and air lines, preferably adjacent to the docking locations of the paint supply lines.

In another embodiment, the robot 10 is connected to a color changer and the sequence of cleaning is initiated through the valves of the color changer. While this approach has the expense of a color changer associated with it, it may be applied to robots in existing installations already having automatic color changers as it relieves the robot 10 from carrying the cleaning lines, and relieves its controller from the task of programming several locations for filling from different paint drop locations. The method and system would still have the advantages of eliminating long paint supply lines and its ability to accommodate electrostatic water-based, as well as solvent-based, paints without special insulating provisions for purging and filling.

In support for the method and system of the invention, a docking valve arrangement is provided to enable the attachment of the canister 12 to the paint drops which includes means that clean the interfaces before connections are made, and maintains a protective cover over the filling interface during the spraying operation, hence avoiding color contamination between canister fillings.

Furthermore, a non-contact sensor is described to allow metering of the filling of the canister 12 in order to use only the exact amount of paint as needed to finish painting a known object.

An embodiment of the invention is also described for an integral canister-robot system having means for displacing paint, metering the amount of paint used, cleaning the canister 12 and paint spray equipment, and docking the canister 12 to a known paint supply location.

Without lines connecting the paint reservoir to the paint supply lines, the method and system are ideal for use with electrostatically charged and conductive paint materials. It eliminates the need for elaborate, complex, and expensive isolation methods, known as voltage blocks, to keep the electrostatic charge from leaking to the normally grounded paint supply lines.

DETAILED DESCRIPTION

With reference again to FIG. 1, the canister 12 is mounted to a part of the robot 10 such as the hollow wrist 16, and may be filled with fluid by docking a check valve or valve assembly, generally indicated at 18, with a fluid supply outlet, such as a check valve or paint drop, generally indicated at 20, and clamping them together by means of an actuating cylinder, generally indicated at 22, to effect fluid communication between the paint drop 20 and the canister 12. The hollow wrist 16 may be generally be of the type disclosed in U.S. Pat. No. 4,708,580 to Akeel.

The canister 12 consists of a cylinder 24 which encloses a piston 26 which has a scraper seal 28 attached to a front face of the piston 26 and which slidably engages an internal cylindrical surface 30 of the cylinder 24 to scrape paint off the surface 30.

Spaced bearing rings 32 circumferentially mounted on the piston 26 provide side support for the piston 26 against possible frictional moments resulting from the movement of the scraper seal 28 inside the cylinder 24 and also function as piston seals.

A central post 34 is used to sealingly guide the linear movement of the piston 26 and for inclusion of a piston position sensing device as described hereinbelow.

A cylinder liner 36 provides a favorable sliding and scraping surface for the scraper seal 28. The piston 26 may be propelled toward a port 38 in the canister 12 by means of pressurized fluid, such as air, introduced into a cavity 40 on one side of the piston 26 through a port 42 in a manifold 44 and a cylinder cap 46 of the canister 12. When a cavity or reservoir 48 of the canister 12 is full of fluid, such as paint, the fluid is propelled on the opposite side of the piston 26 to flow through the port 38 for productive use, such as spray painting.

Figure 7:
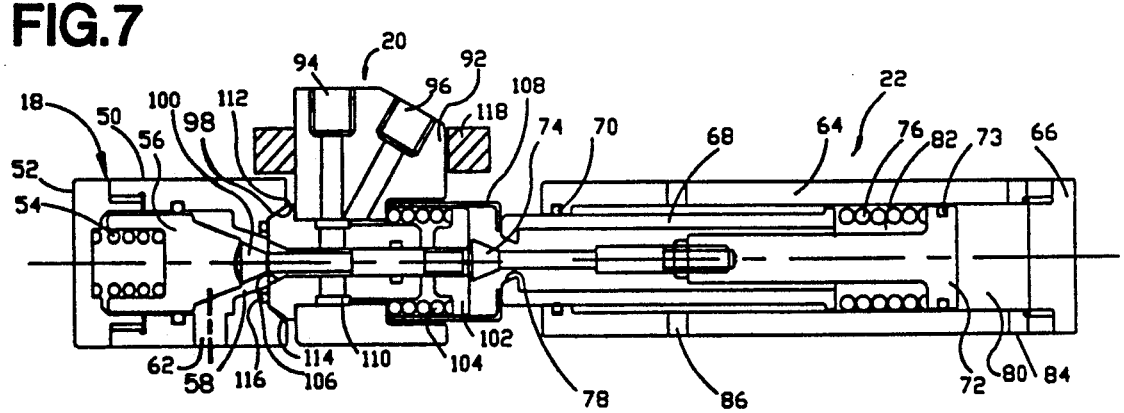

The check valve 18, as illustrated in detail in FIG. 4, includes a casing 50 and an end cap 52 which encloses a spring 54 which acts on a check valve puppet 56 to close a port 58 in the casing 50 as best shown in FIG. 7. The check valve 18 mounts on cylinder 24 as shown in FIG. 1, such that a port 60 in the cylinder 24 and a port 62 in the casing 50 are in fluid communication.

The actuating cylinder 22 has a cylinder body 64 closed at one end thereof by an end cap 66 and at its other end by the sealed engagement of a plunger 68 and a sealing means such as a circular seal 70. A piston 72 is sealingly mounted for sliding movement within the cylinder body 64 by a seal 73. The piston 72 is connected to a check valve puppet 74 to move linearly through and is biased away from the plunger 68 by a spring 76 to effect the closing of a port 78 in the plunger 68 by the check valve puppet 74.

The seal 70 allows the piston 72 to be slidably actuated by means of pressurized fluids introduced into cylinder cavities 80 and 82 at ports 84 and 86, respectively. The cylinder body 64 mounts on the canister body or cylinder 24 such that the ports 84 and 86 are in fluid communication with fluid supply passages, such as a passage 88 as shown in FIG. 1. The passage 88 is communicated to external control valves (not shown), through ports such as a port 90 in the manifold 44 and the end cap 46. Alternatively, the ports 84 and 86 may be communicated to such external control valves by means of hard or flexible tubing as illustrated in FIG. 9.

Figure 8:
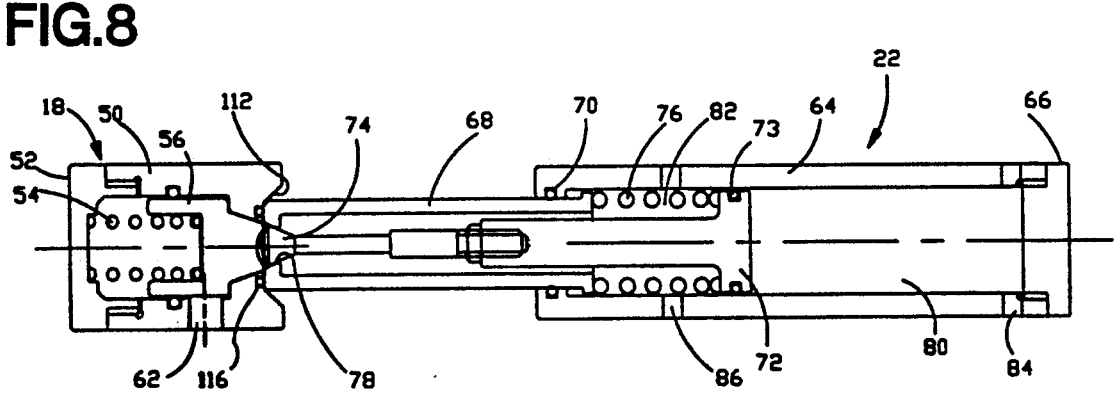
FIG. 8 is similar to FIGS. 4–7 but illustrate the step of maintaining the contents of the canister in a sealed condition.

As shown in FIG. 8, the cylinder 22 is mounted in axial alignment with the check valve 18 such that the extension of the plunger 68 causes the puppet 74 to engage the check valve puppet 56 in a mating arrangement, the purpose of which is described below.

Referring to FIG. 2, there is illustrated control passages 91 in the cylinder 24 which feed into a manifold 95 for spray gun control functions.

Referring to FIG. 3, there is illustrated a paint drop cluster, generally indicated at 19, having different color drops 20, 20' etc. which share a single casing.

As illustrated in FIG. 4, the paint drop 20 has a casing 92 with supply and return ports 94 and 96, respectively, and a cartridge 98 containing a check valve puppet 100 with an end cap 102. A spring 104 keeps the check valve 20 closed as the spring 104 acting on the end cap 102 forces the puppet 100 against a valve seat 106 of the cartridge 98. A spring housing 108 keeps contaminants away from the check valve assembly.

Normally, fluids such as paint are continuously circulated through the paint drop 20 as they enter through the supply port 94 and exits through the return port 96. Paint circulation keeps paint pigments from forming sediments inside a paint drop cavity 110 within the cartridge 98 and maintains paint color uniformity.

Canister Filling

The paint drop 20 is mounted to any fixed structure by means of supports 118. The supports 118 are compliant to accommodate the lateral movement that is necessary to assure a firm sealing engagement at the interface between the paint drop 20 and the check valve 18.

Figure 6:
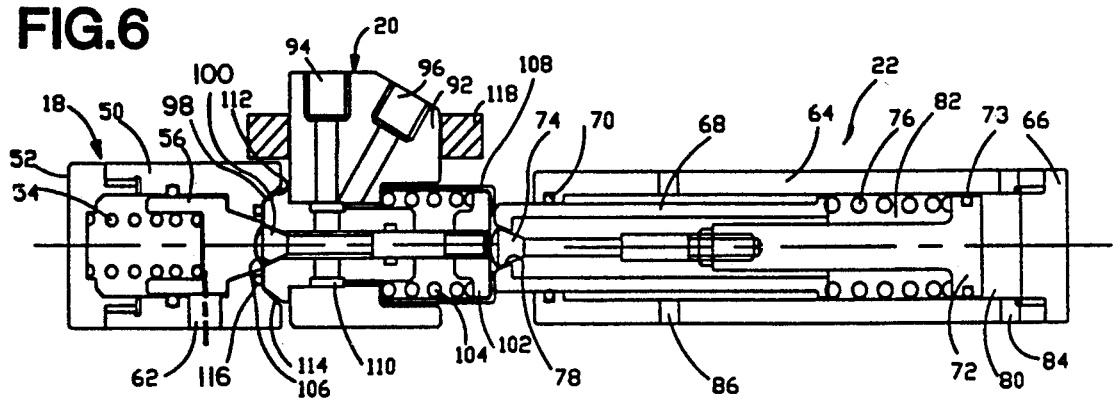

To fill the canister 12 with paint from the paint drop 20, the robot wrist 16 is moved to allow the check valve 18 and the cylinder 22 to straddle the paint drop 20 as shown in FIG. 1. The wrist 16 is then moved to engage the check valve 18 with the paint drop 20 in a butted arrangement as shown in FIG. 5. Conical engagement surfaces 112 and 114 help guide the engagement. The cylinder 22 is then activated by introducing pressurized air through the port 84 into the cavity 80 to engage the plunger 68 with the spring housing 108, as shown in FIG. 6, and help secure the sealing engagement of surfaces 112 and 114 by compressing a seal 116 in the casing 50.

Further movement of the piston 72 compresses the spring 76 and advances the valve puppet 74 against the end cap 102 to compress the spring 104 and engage the puppet 100 with the puppet 56 as both progressively move in the same direction to open both check valves and allow fluid communication between the port 58 and the cavity 110, as shown in FIG. 7. Paint is then allowed to flow from the supply port 94 of the paint drop 20 through the ports 58, 62 and 60 into the canister cavity 48.

Normally, filing is initiated when the cavity 48 is at minimum volume. As paint flows into the canister 12, it displaces the piston 26 to increase the cavity 48 and reduce the cavity 40 until the desired volume of paint has been introduced into the canister 12. The volume of paint may be metered by timing the flow of paint into the cylinder, by monitoring the displacement of the piston by means of linear position sensors, such as potentiometers, for example, or by any method of flow measurement techniques.

When the desired quantity of paint is in the canister 12, a programmable controller (not shown) shuts off the pressurized fluid, or air, from the port 84 and allows the spring 76 to expand thus retracting the piston 72 and the check valve puppet 74 away from paint drop 20. The spring 104 then expands and causes the puppet 100 to retract and close the port 106, thus shutting off the flow of paint into the valve 18 and the canister 12. Simultaneously, the puppet 56 moves under the action of its spring 54 to close the port 58, hence trapping the paint inside the canister 12.

When pressurized air is introduced into the cylinder body 64 through the port 86, the piston 72 is moved into the cavity 80 thus causing the plunger 68 to recede into the cylinder body 64 thus freeing the engagement with the paint drop 20. The robot 10 then moves away from the paint drop 20 and air is introduced into the cylinder body 64 at the port 84 to move the plunger 68 into engagement with the check valve 18, hence protecting the cleanliness of the port 58 from contamination and to prepare the canister 12 for filling with the same or a new color paint. The robot 10 then begins its painting sequence, using the paint contained in the canister 12.

For refilling with the same paint, the sequence described above is repeated at the same paint drop 20.

For changing color, the canister 12 is first cleaned before the sequence described above is repeated at another color drop 20' of the new desired paint color illustrated in FIG. 3.

Canister Cleaning

Cleaning of the canister 12 is done While the plunger 68 is in a sealed engagement with the valve assembly 18 as shown in FIG. 8. High pressure fluid, such as air, is introduced at the port 84 to force the puppet 74 to engage the puppet 56 and allow fluid communication between the port 78 and the port 58. Cleaning fluid, preferably shots of cleaning solvents and air, is introduced through the port 86 to pass through the cavity 82 and ports 78, 58, 62, and 60 into the canister 12, and then through the port 38 to the spray gun 14 or a dump valve (not shown), hence washing away any paint residues that may cling to the surfaces of the canister 12 and its contained parts. When cleaning is finished, the canister 12 may be dried by passing air only through the port 86. When cleaning and drying is complete, the canister 12 is then ready for storage or for filling with a new color.

By providing a dielectric insulator between the canister 12 and the mounting robot part, the paint can be charged with high voltage electrostatic charge without causing the charge to leak to the grounded robot parts. With no connection between the canister and the paint drops, 20, 20', etc., after disengagement, the system requires no elaborate or costly isolation by voltage block arrangement as described in the prior art.

Referring to FIG. 9, there is illustrated a second embodiment of the method and system of the present invention wherein parts which perform the same or similar function to the parts of the first embodiment have a prime designation. In FIG. 9, a canister, generally indicated at 12' is mounted on an arm 11' of a robot, generally indicated at 10'. An external paint hose 13' provides paint to a spray gun 14'. External control lines 90' and 42' provide control signals to control the functioning of the canister 12'. Spray gun control lines (not shown) internal to the robot arm 11' and the wrist 16' provide control signals to the spray gun 14'.

As in all robotic arrangements, the system is usually controlled by a programmable controller which can be programmed to introduce fluids through different valves in a timed and desired sequence.

Non-Contact Position Sensor

Figures 10, 11:
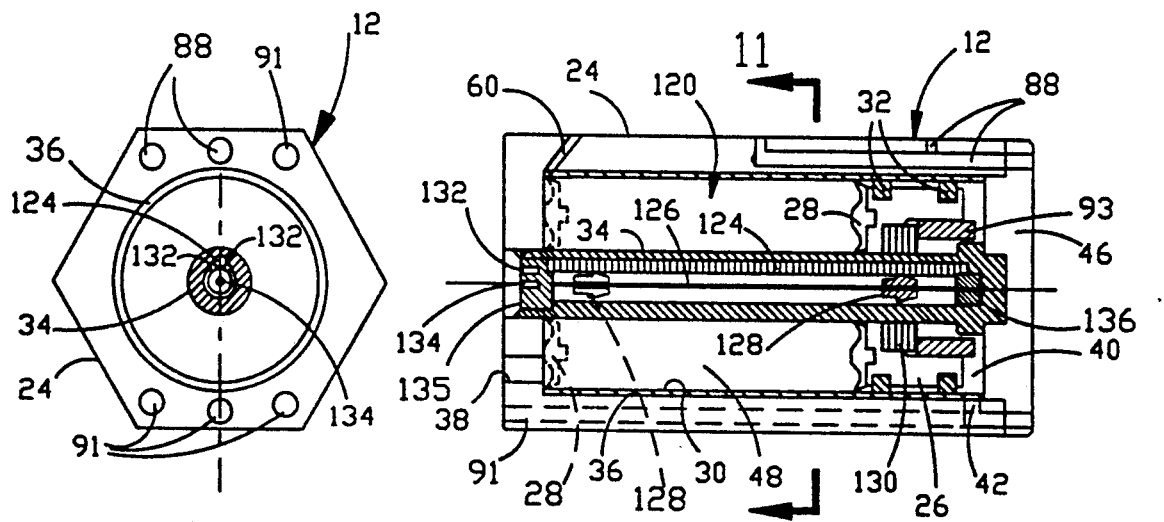
FIG. 10 is an enlarged side elevational view, partially broken away and in cross-section, illustrating the canister of FIG. 1 with a non-contact sensor.
FIG. 11 is an end sectional view of the canister of FIG. 10.

In order to sense the linear position of the piston 26 in the canister 12 without contacting with the piston 26, a non-contact positioning sensor generally indicated at 120 is provided as illustrated in FIGS. 10 and 11. The paint within the cavity 48 is electrostatically charged at high voltage, typically 100 KV. As previously mentioned, the piston 26 is displaced by pressurized paint entering the cavity 48 at the port 60 to be discharged to the spray device 14 through the port 38 by introducing pressurized air through the port 42 into the cavity 40 while port 60 is closed by a check valve (not shown). The seal 28 cooperating with the guide rings 32 help separate the paint and air chambers 48 and 40, respectively. A spacer 93 prevents the piston 26 from engaging the end of the cylinder 24 and is used as a bumper to cushion the impact of the piston at the end of its stroke when displaced at high speed by the fluid entering the cavity 48.

The sensor 120 monitors and controls the position of the piston 26 as it travels inside the canister 12 to allow the metering of the amount of paint entering into, or discharged from, the canister 12. Exposing conventional sensors, such as potentiometers, encoders, linear variable differential transformers (LVDT), or the like to the paint is impractical. Hence, a non-contact sensor that is isolated from the paint environment of the piston 26 is a necessity. Sensors that track the piston from outside the canister 12 are possible to install, but when space is limited, an internal sensor is required and should be insulated from the paint and electrostatic environment.

As shown in FIG. 10, the sensor 120 includes the hollow, central post 34 containing a sensor element 124, a guide wire or element 126 and a tracer element 128. In FIG. 10, the tracer element 128 and the seal 28 are illustrated in two different positions on the guide element 126. The sensor element 124 may be of any conventional type, such as a potentiometer resistive element, a toothed encoder element, an optically encoded element, a stack of Hall-effect sensors, or the like.

A mechanism for generating a magnetic field such as a magnet 130 is secured to move with the piston 26 and is mounted such that it traps the tracer element 128 by its magnetic field. The tracer element 128 has a component made of a ferromagnetic material so as to be responsive to the magnetic field of the magnet 130, and is mounted to move along the guide element 126 while it engages the sensor element 124 either by direct contact or through optical coupling. The tracer element 128 moves between end caps or pieces 135 and 136 which provide integrity to the sensor 120. The end caps 135 and 136 may be made from an epoxy resin to seal the sensor 120.

The central post 34 may be constructed of a material that is compatible with the environment of cavity 48; however, in the presence of electrostatic charge, the central post 34 should be made of insulating dielectric material, many commercially available plastic materials are well suited for this purpose.

Accordingly, when the piston 26 is displaced inside the canister 12, the tracer element 128 is moved along the guide element 126 in response to the movement of the magnet 130 with the piston 26. The sensor element 124 provides a signal that is indicative of the position of the tracer 128, and hence of the piston 26. The signal is then communicated to the outside of canister 12 by terminals 132 and 134, for use by a conventional control means or controller to regulate the flow of the fluid into the canister 12 or the displacement of the piston 26 pushing the fluid. When the sensor element 124 is a resistance potentiometer, the tracer element 128 may be made of an electrically conductive material or be provided with an electrically conductive contact wiper as is normally found in conventional potentiometers, such contact wiper may then engage both the potentiometer element as well as the conductive guide wire 126.

The signal indicating the position of the piston 26 may then be measured by several well known methods. For example, when a voltage $V_o$ is applied between the terminals 132 and 134, a measurement of the current flowing into the potentiometer 124 through the guide wire 126 is a measure of piston position within the canister 12.

When a voltage $V_o'$ is applied between the two end terminals 132 of the potentiometer 124, the voltage between one of the two end terminals 132 and the terminal 134 is a measure of the position of the tracer, and hence the piston 26.

If two equal resistances are connected to the terminals 132, and a voltage $V_o''$ is applied between the terminals 132, in a well known arrangement known as a Wheatstone Bridge, the voltage between the terminal 134 and the junction of the resistances is a measure of the position of the tracer 128.

These methods require that the tracer 128 makes electrical contact with the potentiometer or sensor element 124 and the guide element 126 which is also electrically conductive. A conductive lubricant may be used at the bearing surface between the guide element 126 and the tracer 128 to reduce friction. This improves sensor responsiveness and resolution by preventing stiction or tracer breakaway from the magnetic field.

It should be noted that when the sensor element 124 is other than a potentiometer, the tracer 126 will carry a corresponding signal pick-up device such as a photo sensor and may require multiple guide wire elements, such as 124, to independently communicate the multiple signals that may be required for such sensors.

SUMMARY

The new method and system uses a transfer device such as a robotic manipulator to carry a container that is piped to a spray applicator, and connects it directly to paint color outlets (paint drops) without the need for a color changer. Accordingly, the robotic manipulator, through its controls program, seeks the paint drop of the desired color, connects the container for filling with the desired paint color, and then activates the spray applicator for productive paint spraying use. The manipulator has access to sources of pressurized air for paint delivery and line purging as well as sources for cleaning fluids. Valving arrangements are provided on the manipulator to control the flow of fluids according to the desired sequences of painting or cleaning.

The method and system involves the mating of two check valves in a sealed arrangement and the simultaneous opening of the two valves to effect the flow of fluid from the fluid source into the container. One of the two valves opens inwardly into the container while the other opens outwardly from the fluid outlet. Springs keep the two valves normally closed until an actuator is energized to push the spring loaded stem of one valve against its spring, thus opening it and simultaneously pushing the other valve also to open; hence, allowing fluid communication between the container and the fluid outlet.

The method and system allow the filling of containers in a sealed environment, wherein the interfaces are wiped clean by virtue of the tandem movement of the two valves hence allowing no space to exist between the valves at any instant during the opening or closing operation, hence, minimizing loss of fluids and the need for excessive cleaning effort of the interfaces.

The method and system also involve the use of a protective interface to keep the filling port clean from outside contamination, the use of the protective interface to communicate cleaning fluids to the canister without disengagement, and the use of the same protective interface to secure positive engagement of the filling port with the fluid outlet during subsequent filling operations.

A non-contact sensor utilized in the system and method is a linear transducer that senses the position of a piston being displaced by the filling fluid and the termination of filling when the piston reaches a location indicating that the desired amount of fluid has entered the container.

The non-contact sensor responds to the motion of the piston by means of magnetic coupling wherein there is no physical contact between the moving object and any part of the sensor. By contrast, LVDT's sense motion by magnetic coupling but require that the object physically push one of the sensor elements relative to the other.

The piston carries a magnetic field generating mechanism such as a magnet which cooperates with a responsive ferromagnetic tracer of the sensor. The sensor element may be an electrically resistive potentiometer cooperating with the conductive ferromagnetic tracer.

The ferromagnetic tracer in the sensor is preferably a bead made of a conductive ferromagnetic material and is guided along the conductive guide wire and forced to contact the sensor element by the magnetic force. Since the guide wire or element is conductive, it can communicate a signal of the sensor to a controller. The sensor element is isolated electrostatically and fluidly from the piston and its environment.

While the best mode for carrying out the invention has been described in detail, those familiar with the art to which this invention relates will recognize various alternative designs and embodiments for practicing the invention as defined by the following claims.

What is claimed is:

1. A system for robotically transferring fluid from a pressurized source of fluid, the system comprising:
   an outlet valve having self-closing means and adapted for fluid communication with the pressurized source of fluid;
   a robot having a wrist;
   a delivery device for the fluid mounted on the wrist to move therewith;
   a reservoir including an inlet valve having self-closing means and a filling port for the fluid, the reservoir being supported on the robot for fluid communication with the delivery device; and
   actuating means independent of the inlet and outlet valves for sealingly mating and then opening the inlet and outlet valves to fluidly communicate the filling port of the reservoir with the fluid outlet of the pressurized source of fluid to permit the reservoir to be filled with fluid from the pressurized source of fluid.

2. The system as claimed in claim 1 wherein the actuating means opens the inlet and outlet valves substantially simultaneously.

3. The system as claimed in claim 1 or claim 2 wherein the actuating means allows the inlet and outlet valves to be closed substantially simultaneously.

4. The system as claimed in claim 1 wherein the actuating means is movable between a home position, a sealing position in which the actuating means applies a sealing force for mating the inlet and outlet valves and an actuating position in which the actuating means opens the inlet and outlet valves.

5. The system as claimed in claim 4 wherein the actuating means moves the inlet and outlet valves in tandem as the actuating means moves from its sealing position towards its actuating position.

6. The system as claimed in claim 4 wherein each of the self-closing means of the inlet and outlet valves includes biasing means to bias the respective valves to their respective closed positions, each of the biasing means moving its respective valve in tandem with the actuating means when the actuating means moves from its actuating position towards its home position.

7. The system as claimed in claim 4 further comprising sealing means for sealing the inlet and outlet valves in the actuating position of the actuating means.

8. The system as claimed in claim 1 or claim 7 wherein the actuating means is mounted on the robot in alignment with the inlet valve.

9. The system as claimed in claim 1 wherein the actuating means has a protective position and wherein the system further comprises seal means for sealing the actuating means and the inlet valve to sealingly protect the inlet valve from contamination in the protective position of the actuating means.

10. The system as claimed in claim 1 or claim 9 wherein the actuating means is mounted on the reservoir in alignment with the inlet valve.

11. The system as claimed in claim 1 or claim 9 wherein the system further comprises a pressurized source of cleaning fluid having a fluid outlet and wherein the actuating means has a cleaning position in which the actuating means opens the inlet valve to fluidly communicate the filling port of the reservoir and the fluid outlet of the pressurized source of cleaning fluid to clean the reservoir.

12. The system as claimed in claim 1 where the wrist is hollow and has an output drive axis and wherein the reservoir is mounted on the wrist and has a longitudinal axis coincident with the output drive axis.

13. The system as claimed in claim 12 wherein the reservoir has a plurality of longitudinally extending control apertures extending therethrough for communicating a control fluid therethrough from the hollow wrist to the delivery device to control the delivery device.

14. The system as claimed in claim 1 wherein the actuating means has a cleaning position in which the actuating means opens the inlet valve and wherein the system further comprises:

a pressurized source of cleaning fluid with a fluid outlet and means for fluidly communicating the filling port of the reservoir and the fluid outlet of the pressurized source of cleaning fluid in the cleaning position of the actuating means to clean the reservoir.

15. The system as claimed in claim 14 wherein the means for fluidly communicating the filling port includes means for fluidly communicating the fluid outlet of the pressurized source of cleaning fluid to the actuating means; and means for fluidly communicating the actuating means to the filling port of the reservoir.

16. The system of claim 1 where at least one of the inlet and outlet valves is a poppet valve.

17. The system of claim 16 wherein both of the inlet and outlet valves are poppet valves which are adapted to be sealingly mated by the actuating means without relative motion between the inlet and outlet valves.

18. The system of claim 1 wherein the actuating means is adapted to be externally energized.

19. A system for robotically transferring fluid from a pressurized source of fluid, the system comprising:

an outlet valve adapted for fluid communication with the pressurized source of fluid;

a robot having a wrist;

a delivery device for the fluid mounted on the wrist to move therewith;

a reservoir including an inlet valve and a filling port for the fluid, the reservoir being supported on the robot for fluid communication with the delivery device; and actuating means for sealingly mating and then opening the inlet and outlet valves to fluidly communicate the filling port of the reservoir with the fluid outlet of the pressurized source of fluid to permit the reservoir to be filled with fluid from the pressurized source of fluid and wherein the wrist is hollow and has an output drive axis and wherein the reservoir is mounted on the wrist and has a longitudinal axis coincident with the output drive axis.

20. The system as claimed in claim 19 wherein the reservoir has a plurality of longitudinally extending control apertures extending therethrough for communicating a control fluid therethrough from the hollow wrist to the delivery device to control the delivery device.

* * * * *